United States Patent Office 3,513,208
Patented May 19, 1970

3,513,208
PROCESS FOR PRODUCING HIGH PURITY
CYCLODODECANE
Chien-Yung Lee, Kendall Park, N.J., assignor to Cities
Service Company, New York, N.Y., a corporation of
Delaware
No Drawing. Filed May 2, 1968, Ser. No. 726,208
Int. Cl. C07c 5/02, 13/00
U.S. Cl. 260—666                               9 Claims

ABSTRACT OF THE DISCLOSURE

Processes are described for minimizing the production of aromatic and unsaturated aliphatic by-products during the hydrogenation of a cyclododecatriene to the corresponding cyclododecane by conducting the hydrogenation reaction at a temperature below about 150 C. until a total of at least about two moles of hydrogen per mole of cyclododecatriene have reacted and completing the reaction at a temperature above 150° C. These cyclododecane products are suitable, without subsequent purification, for conversion to lactam or acyclic dibasic acid.

BACKGROUND OF THE INVENTION

Field of the invention

This invention relates to the production of saturated cycloaliphatic compounds having a twelve member carbocyclic ring by reacting gaseous hydrogen with the corresponding cycloaliphatic compounds having three ethylenic double bonds in the carbocyclic ring.

Description of the prior art

Procedures for the selective hydrogenation of unsaturated aliphatic compounds, including large ring cycloaliphatics such as cyclododecatriene, are well known. Such prior art procedures are generally conducted in a stirred pressure reactor at a fixed elevated pressure and temperature until a stoichiometric quantity of hydrogen has been absorbed by the unsaturated aliphatic feed. Both molecular hydrogen, in conjunction with a wide variety of metal or metal salt hydrogenation catalysts, and nascent hydrogen are commonly utilized. In many cases the nature of the feedstock and the intermediates formed during the course of these reaction are such that high selectivities to the desired products can be obtained under a broad range of reaction conditions. The cyclododecatrienes are, however, unique in that under conventional hydrogenation conditions, extensive isomerization or degradation of the starting material, intermediates and desired product may occur. Gas chromatographic analyses made during various stages of the hydrogenation of cyclododecatriene have indicated that as many as forty eight different compounds or isomers may be present. This peculiar susceptibility of unsaturated twelve member carbocyclic ring structures to isomerization or degradation leads to the production of hydrogenated products containing impurities which are difficult to remove by simple distillation procedures and which may render these products economically or technically unsuitable for many uses.

For example, in the high temperature isothermal hydrogenation of cyclododecatriene to cyclododecane (see Example 1, below), the product is found to contain large quantities of aromatic contaminants, exemplary of which are benzocyclooctene and benzocyclooctane, which are believed to result from the thermally induced collapse of an intermediate cyclododecadiene ring. The presence of these materials as contaminants in the cyclododecane product of such reaction is, of course, undesirable if this product subsequently is to be converted to the corresponding alpha-omega dibasic acid or lactam. Purification procedures are, therefore, generally necessary in order to reduce the aromatics concentration to an acceptable value below about 1% by weight.

While the yield of aromatic impurities may be reduced somewhat by conducting a low temperature isothermal hydrogenation reaction (see Example 2, below), this has proved to be commercially impracticable because of the extremely long reaction periods required and the fact that the product is contaminated with equally undesirable ethylenically unsaturated byproducts in quantities far in excess of 0.1% by weight (calculated as cyclododecatriene), a figure which represents the maximum quantity that can be tolerated in acid or lactam grade cyclododecane.

A procedure is taught by copending application Ser. No. 603,462, now Pat. No. 3,400,166 issued Sept. 3, 1968, by which the yield of aromatics in the hydrogenation of cyclododecatriene is greatly reduced by first reacting from about 0.75 mole to about 1.8 moles of hydrogen per mole of cyclododecatriene at a temperature below about 160° C. and then completing the reaction at an increased temperature. Although operation within these broad process limits in the production of cyclododecane also reduces the ethylenically unsaturated compound contamination, it generally is not effective in lowering the concentration of these materials to within acceptable limits (see Example 3a below).

SUMMARY

A principal object of this invention is to provide an improved process for saturating cycloaliphatic compounds having a twelve member carbocyclic ring containing three ethylenic double bonds which is relatively free of the aforementioned disadvantages of the similar prior art processes. A particular object of this invention is to provide a process for minimizing the formation of both aromatic and ethylenically unsaturated byproducts during the rapid hydrogenation of cyclododecatriene-1,5,9 to cyclododecane, thereby producing a product which can, without further purification, be satisfactorily converted to laurolactam or dodecandioic acid. It has now been found that these objects and other features of advantage, which will be apparent to those skilled in the art, can be achieved by conducting the hydrogenation operation under carefully controlled process conditions as set forth below.

Broadly, this invention involves the discovery that the formation of both aromatic and ethylenically unsaturated byproducts can be minimized during the production of a cyclododecane from the corresponding cyclododecatriene and gaseous hydrogen by maintaining the reaction temperature below about 150° C. until a total of at least about two moles of hydrogen per mole of cyclododecatriene have reacted and then increasing the reaction temperature to above about 150° C. at the completion of the reaction of a total about three moles of hydrogen per mole of cyclododecatriene.

DESCRIPTION OF THE PREFERRED EMBODIMENTS

Although one can obtain acceptable acid or lactam grade cyclododecane from cyclododecatriene hydrogenation carried out under a wide range of reaction conditions within the aforementioned critical limits of this invention, further reductions in the ethylenic unsaturation level of the product often are highly desirable. It has been found that such further reductions can be effected to a surprising degree by operating within specific narrower ranges of reaction conditions, as discussed in detail below. The magnitude of this further improvement is demonstrated by Examples 5 through 8 which illustrate such preferred embodiments of this invention.

As previously indicated, desirably low product contamination can be obtained through the practice of this invention when as little as about two moles of hydrogen per mole of cyclododecatriene are reacted during the low temperature (i.e. below about 150° C.) phase of the reaction. Product quality can, however, be significantly improved when this quantity of hydrogen is increased to from about 2.1 to about 2.9, preferably about 2.3 to about 2.7 moles per mole of cyclododecatriene. Even greater improvements are evident when at least the first mole, and preferably at least the first two moles of hydrogen per mole of cyclododecatriene are reacted at a temperature of from about 61° C. (the melting point of cyclododecane) to about 120° C., preferably from about 70° C. to about 100° C.

Similarly, while acceptable product can be obtained when the reaction temperature is increased to any value above about 150° C. at the completion of the reaction of a total of about three moles of hydrogen per mole of cyclododecatriene, product quality is enhanced by employing a final temperature of at least 180° C. This final or "finishing" temperature may be as high as 250° C. or higher; however there is little advantage in operating outside the preferred range of from about 180° C. to about 220° C. Superior results are generally obtained when this finishing temperature is maintained during the reaction of at least about the final 1%, preferably about 3 to 5%, of the total reacted hydrogen.

While employment of any one of these preferred procedures in the practice of the process of this invention will effect a reduction in the quantity of ethylenic unsaturation in the cyclododecane product, optimum results are obtained when all are utilized. Thus, an especially preferred embodiment of this invention comprises maintaining a reaction temperature of from about 70° C. to about 100° C. until at least about two moles of hydrogen per mole of cyclododecatriene have reacted, maintaining a reaction temperature of less than about 150° C. until a total of from about 2.1 to about 2.9 moles of hydrogen per mole of cyclododecatriene have reacted, increasing the reaction temperature of a "finishing" temperature of from about 180° C. to about 220° C. during the completion of the reaction of a total of about three moles of hydrogen per mole of cyclododecatriene and maintaining this finishing temperature during the reaction of at least about the final 1% of the total reacted hydrogen.

The increase in reaction temperature during the temperature staged hydrogenation reaction of this invention may be by one or more discrete increments, as in Example 5, or the temperature may be smoothly increased as in Example 7.

Although temperature staging, as described above, effectively minimizes the formation of both aromatics and ethylenically unsaturated byproducts during the hydrogenation of cyclododecatriene under any hydrogen partial pressure, reaction time and operating efficiency are usually enhanced by employing a hydrogen partial pressure of at least about 10 p.s.i. Advantageously, the hydrogen partial pressure is maintained at from about 20 to about 100 p.s.i. while the reaction temperature is below about 150° C. and from about 30 to about 600 p.s.i. or higher while the reaction temperature is above about 150° C. When pressure staging is employed, it may, like temperature staging, be effected either in discrete steps or smoothly. The hydrogenation reaction of this invention may be conducted utilizing any hydrogenation source which does not contain excessive quantities of reactive impurities. Thus, reformer streams containing from about 70% to about 95% by weight of hydrogen or synthesis gas containing substantial quantities of carbon dioxide can be employed. Nascent hydrogen may be used in the absence of a hydrogenation catalyst; however, economic consideration will generally dictate the use of a source of molecular hydrogen in the presence of a conventional hydrogenation catalyst.

Exemplary of such suitable catalysts, which may be used with or without a support, are those containing a Group VIII metal, and particularly a noble metal. The catalyst selected and the concentration employed will, of course, influence both the product distribution and reaction time. The effect of temperature and pressure staging as described herein can, however, be realized to varying degrees with any conventional hydrogenation catalyst. Particularly favorable results and short reaction times can be obtained by the use of from about 0.1% to about 10%, preferably 0.2% to 2% by weight (based on cyclododecariene feed) of a catalyst containing from about 1% to about 10% by weight of finely divided metallic palladium on a vegetable charcoal substrate. Since such material may be pyrophoric, it is advantageously employed in a water wet condition.

Although it is not essential that solvents be used in the practice of the instant invention, the presence of inert liquids, such as hexane or heptane, may be helpful in controlling the temperature during the course of the reaction.

It is important that the reaction mixture be well agitated, pariculary during that portion of the reaction which is conducted below 150° C., to prevent localized overheating and to insure efficient contact between the liquid reaction mixture and hydrogen. Suitable mixing can be effected by any conventional means, such as by the use of a propeller or turbine agitator or by sparging the reaction mixture with hydrogen.

Cyclododecatrienes suitable for use in the present invention include all of the stereo isomers of cyclododecatriene-1,5,9, as well as cyclododecatrienes containing conjugated unsaturation and lower alkyl or halogen substituted analogues of these hydrocarbons, such as the methyl, dimethyl and trimethyl cyclododecatrienes. It is not essential that these materials be used in a highly purified form; however, it should be understood that the maximum benefits of this invention will be realized when reactive impurities and known catalyst poisons are essentially absent.

The hydrogenation reactions of this invention may suitably be conducted in any reactor in which the reaction temperature and pressure can be controlled within the limits discussed above. Such reactor is also advantageously provided with conventional means for monitoring hydrogen consumption; calculations based on gas flow meter readings or hydrogen reservoir depletion being generally satisfactory. If more precise control of temperature and pressure staging points is desired, a somewhat greater degree of accuracy in measuring reacted hydrogen can, of course, be achieved by sampling and analyzing the reactor liquids. When repeated hydrogenations of a standard composition feedstock are conducted under substantially identical conditions, as in a commercial operation, particluarly accurate and rapid results can be obtained using a calibrated refractometer.

The numerous advantages inherent in operations conducted in accordance with the instant invention will be evident from an examination of the following comparative examples. In each of these examples, a clean dry 500 milliliter autoclave, equipped with a magnetic stirrer, is charged with two grams of 5% palladium on carbon carbon catalyst and 162 grams of 99+ percent pure cyclododecatriene-1,5,9. Stirring is then commenced and the autoclave swept with high purity hydrogen for two minutes. Heat is applied and additional high purity hydrogen is introduced as set forth in the individual examples. The reactions are terminated by venting the autoclave and filtering the hot reaction product to recover catalyst.

Examples 1 and 2 illustrate prior art isothermal procedures for the production of cyclododecane. Example 3 shows that significant reductions in aromatics production can be effected by employing a typical temperature staging procedure as disclosed in copending application Ser. No. 603,462, now Pat. No. 3,400,166 issued Sept. 3, 1968, but that the ethylenic unsaturation level remains excessive. Examples 3b, c and d show that supplemental hydrogenation has little effect on this level. A comparison of these examples with Example 4 demonstrates that utilization of the improved process of the instant invention, as in the latter example, results in a substantial reduction in ethylenic unsaturation. Additional improvements which can be realized by operation in accordance with preferred embodiments of this invention are illustrated by Examples 5 through 8.

EXAMPLE 1

The autoclave is pressured to 20 p.s.i.g. with hydrogen and then heated rapidly to 190° C. These conditions are maintained until six grams (three moles) of hydrogen have been reacted. Analysis of the reactor product shows that it contains about 9% by weight of aromatics with high ethylenic unsaturation.

EXAMPLE 2

The autoclave is pressured to 20 p.s.i.g. with hydrogen and heated rapidly to 148° C. These conditions are maintained for eight hours, at which time less than three moles of hydrogen have reacted. The aromatics and ethylenic unsaturation (calculated as cyclododecatriene) concentrations in the reaction mixture are both in excess of 1% by weight.

EXAMPLE 3a

The autoclave is pressured to 20 p.s.i.g. with hydrogen and heated rapidly to 148° C. These conditions are maintained until 1.6 moles of hydrogen have reacted. The temperature is then rapidly raised to 170° C. and held at this figure under a hydrogen pressure of 20 p.s.i.g. until an additional mole of hydrogen has reacted. The pressure is then increased to 40 p.s.i.g. as the temperature is rapidly raised to 190° C. These conditions are maintained until a final 0.4 mole portion of hydrogen has reacted. The reaction product contains less than 1% by weight of aromatic impurities with more than 0.2 wt. percent ethylenic unsaturation (calculated as cyclododecatriene).

EXAMPLE 3b

The procedure of Example 3a is repeated except that the reaction mixture is subjected to supplemental hydrogenation at 190° C. and 40 p.s.i.g. for one hour after completion of the reaction of three moles of hydrogen. The cyclododecane product purity is essentially identical to that of Example 3a.

EXAMPLE 3c

The procedure of Example 3b is repeated except that the supplemental hydrogenation is conducted at a temperature of 220° C. No significant improvement in product quality is obtained.

EXAMPLE 3d

The procedure of Example 3c is repeated except that the supplemental hydrogenation is conducted under a hydrogen pressure of 400 p.s.i.g. The level of ethylenic unsaturation (calculated as cyclododecatriene) in the product is slightly less than 0.2 wt. percent.

EXAMPLE 4

The autoclave is pressured to 20 p.s.i.g. with hydrogen and heated rapidly to 148° C. These conditions are maintained until 2.6 moles of hydrogen have reacted. The pressure is then increased to 40 p.s.i.g. and the temperature rapidly raised to 190° C. during the reaction of an additional 0.4 mole portion of hydrogen. The reaction product contains less than 1 wt. percent aromatics and less than 0.1 wt. percent ethylenic unsaturation (calculated as cyclododecatriene).

EXAMPLE 5

The autoclave is pressured to 20 p.s.i.g. with hydrogen, heated rapidly to 88° C. and held at these conditions until 1.1 moles of hydrogen have reacted. The temperature is then rapidly increased to 148° C. and held at this figure until a total of 2.6 moles of hydrogen have reacted. A further rapid increase in temperature to 193° C. is accompanied by an increase in pressure to 40 p.s.i.g. These conditions are maintained until a final 0.4 mole portion of hydrogen has reacted. The product contains less than 1 wt. percent aromatics and less than 0.05 wt. percent ethylenic unsaturation (calculated as cyclododecatriene).

EXAMPLE 6

The procedure of the preceeding example is repeated except that 2.1 moles of hydrogen, rather than 1.1 moles, are reacted before the temperature is raised above 88° C. The aromatics content of the product is comparable to that of the preceeding example, but less than half as much ethylenic unsaturation is found.

EXAMPLE 7

The autoclave is pressured to 40 p.s.i.g. with hydrogen and heated rapidly to 61° C. The temperature is then gradually increased while maintaining a hydrogen pressure of 40 p.s.i.g. The total hydrogen consumption is 2.1 moles when the temperature reaches 95° C. and is 2.9 moles when the temperature reaches 185° C. The temperature and pressure are then maintained at 185° C. and 40 p.s.i.g. until an additional 0.1 mole portion of hydrogen has reacted. The product contains less than 1 wt. percent aromatics and less than 0.03 wt. percent ethylenic unsaturation (calculated as cyclododecatriene).

EXAMPLE 8

The autoclave is pressured to 15 p.si.g. with hydrogen and heated rapidly to 88° C. These conditions are maintained until 2.1 moles of hydrogen have reacted. The pressure is then increased to 100 p.s.i.g. and the temperature to 193° C. during the reaction of an additional 0.6 mole of hydrogen. A final 0.4 mole portion of hydrogen is then reacted at 193° C. and 100 p.s.i.g. The product contains less than 1 wt. percent aromatics and less than 0.01 wt. percent ethylenic unsaturation (calculated as cyclododecatriene).

I claim:
1. In a process for producing a cyclododecane by hydrogenating a cyclododecatriene with gaseous hydrogen, the improvement which minimizes product contamination with ethylenically unsaturated materials to less than 0.1 wt. percent calculated as cyclododecatriene comprising maintaining a reaction temperature of up to about 120° C. until at least about the first mole of hydrogen per mole of said cyclododecatriene has reacted, maintaining a reaction temperature of up to about 150° C. until a total of at least about two moles of hydrogen per mole of said cyclododecatriene have reacted and increasing the reaction temperature to at least about 180° C. at the completion of the reaction of a total of about three moles of hydrogen per mole of said cyclododecatriene.

2. The process of claim 1 wherein a reaction temperature of from about 70° C. to about 100° C. is maintained until a total of at least about two moles of hydrogen per mole of said cyclododecatriene have reacted.

3. The process of claim 1 wherein a reaction temperature of from about 180° C. to about 220° C. is maintained during the reaction of at least the final 1% of said total of about three moles of hydrogen.

4. The process of claim 1 wherein a reaction temperature of from about 61° C. to about 150° C. is maintained until from about 2.1 to about 2.9 moles of hydrogen per mole of said cyclododecatriene have reacted and a reaction temperature of from about 180° C. to about 220° C. is maintained during the reaction of at least about the final 1% of said total of about three moles of hydrogen.

5. The process of claim 1 wherein said hydrogenation is conducted in the presence of a hydrogenation catalyst.

6. The process of claim 5 wherein said hydrogenation catalyst is a Group VIII metal.

7. The process of claim 1 wherein said hydrogenation is conducted under a hydrogen partial pressure of at least about 10 p.s.i.

8. The process of claim 7 wherein said hydrogen partial pressure is maintained at from about 20 to about 100 p.s.i. while the reaction temperature is below about 150° C. and at from about 30 to about 600 p.s.i. while the reaction temperature is above about 150° C.

9. In a process for producing cyclododecane by hydrogenating cyclododecatriene-1,5,9 with gaseous hydrogen in contact with a Group VIII metal hydrogenation catalyst, the improvement which minimizes product contamination with ethylenically unsaturated materials to less than 0.1 wt. percent calculated as cyclododecatriene comprising maintaining a reaction temperature of from about 70° C. to about 100° C. until at least about 1 mole of hydrogen per mole of said cyclododecatriene has reacted, maintaining a reaction temperature below about 150° C. until a total of from about 2.1 to about 2.9 moles of hydrogen per mole of said cyclododecatriene have reacted, increasing the reaction temperature to from about 180° C. to about 220° C. at the completion of the reaction of a total of about three moles of hydrogen per mole of said cyclododecatriene and maintaining the reaction temperature at from about 180° C. to about 220° C. during the reaction of at least about the final 1% of said total of about three moles of hydrogen.

References Cited

UNITED STATES PATENTS 3,400,166  9/1968  McAlister.

DELBERT E. GANTZ, Primary Examiner

V. O'KEEFE, Assistant Examiner